(No Model.)

C. C. HARKER.
APPARATUS FOR MEDICATING WATER.

No. 349,884. Patented Sept. 28, 1886.

Witnesses
Jos. S. Latimer
J. J. Sheehy

Inventor
Chas. C. Harker.
By his Attorney
Frank Sheehy.

N. PETERS. Photo-Lithographer, Washington, D. C.

UNITED STATES PATENT OFFICE.

CHARLES C. HARKER, OF TROY, OHIO.

APPARATUS FOR MEDICATING WATER.

SPECIFICATION forming part of Letters Patent No. 349,884, dated September 28, 1886.

Application filed December 28, 1885. Serial No. 186,957. (No model.)

*To all whom it may concern:*

Be it known that I, CHARLES C. HARKER, a citizen of the United States, residing at Troy, in the county of Miama and State of Ohio, have invented certain new and useful Improvements in Apparatus for Medicating Water for the Treatment of Diseases in Hogs; and it consists in the construction, novel arrangement, and adaptation of devices, as will be hereinafter more fully set forth and claimed.

Figure 1:
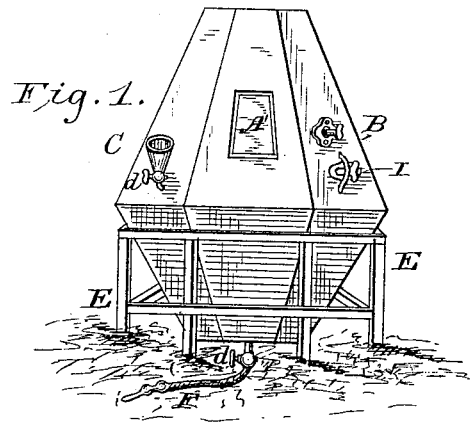
Figure 2:
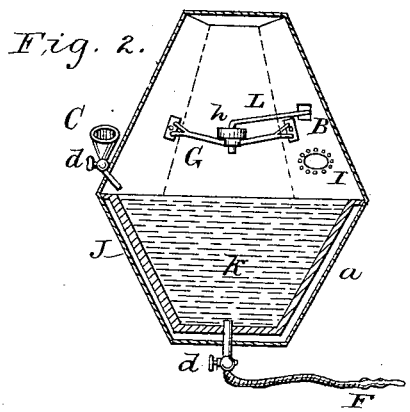
Figure 4:
Figure 6:
Figure 3:
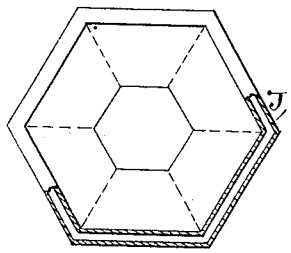
Figure 5:

In the annexed drawings Figure 1 is a view of a side elevation of my improved apparatus. Fig. 2 is a vertical sectional view of the same. Fig. 3 is a plan view of the lower section of the tank, showing the air-chamber. Fig. 4 is a view of the agitator-rod. Fig. 5 is a view of the bracket for supporting the cup, and Fig. 6 is a view of the cup.

Referring by letter to the said drawings, A indicates the tank, which is for holding the water to be medicated. This tank is constructed with a tapering base, $a$, so as to allow the entire contents to be drawn from the tank, and a closed top, which is preferably of truncated cone shape. This tank is formed of metal, and has a lining in its lower portion, which is of wood or other suitable non-corrodible substance, and so arranged therein as to form a continuous air-chamber, J, whereby the contents of the inner vessel may be kept cool, and also prevented from freezing. The under or base section is provided in its bottom with a short tube, which may be threaded and provided with a cock, as shown, for closing the same.

F indicates a hose having a nozzle and attached to the said short tube to draw off the water from the tank. By this arrangement it will be seen that when hogs or other animals are threatened with or have disease—such as cholera—they may be conveniently washed or bathed by means of the hose with the medicated water.

G indicates a bracket, which is composed of two angular branches having attaching devices at their outer ends and a central socket-aperture, $c$, for the reception of the cup H, which is designed to contain sulphur and charcoal, which, when burned, form sulphurous acid gas to impregnate the water in the tank. This bracket is secured to the inner walls of the upper section of the tank A, so as to hold the cup in about the central vertical line thereof.

C indicates a funnel, which is secured in one of the sides of the upper section of the tank, charging the same with water, and also for adding carbolic acid to the water in about the proportions of one dram of the former to one gallon of the latter, which funnel is provided with a faucet, as shown, for opening and closing the same.

E indicates a frame, which is properly braced so as to support the tank at a suitable height to manipulate the cock in the bottom.

A' indicates an opening, which is closed with a glass or the like to enable the attendant to view the interior of the tank and the ingredients in the cup H, and B is a stuffing-box, through which passes the agitator-rod L, which is designed for stirring up and promoting the combustion of sulphur and charcoal placed in the said cup, the impregnation of the water being attained by the gas generated from the sulphurous acid through the medium of the burning of the charcoal and sulphur and the addition of carbolic acid, as above stated.

$i$ indicates a hand-hole, which may be covered with suitable material to make the same air-tight. Through this hand-hole the attendant may adjust the cup H in its bearing and renew the contents.

The water may be served to the hogs as an ordinary drink, or it may be used in preparing their food.

The process of medicating water with the above apparatus is conducted as follows: The lower wood-lined part of the vessel is charged, through the funnel C, with a known quantity of water, and carbolic acid is added in about the proportions above stated. The funnel-cock is then shut and the funnel filled with water to make a hermetically-sealed joint. The cup H, which is in fact a furnace, is then charged with charcoal and sulphur and the same ignited. This cup is then adjusted in its seat in the center of the bracket G and the hand-hole hermetically sealed. The oxygen of the air in the vessel will now combine with the burning sulphur, and sulphurous acid gas will be produced. At the same time a partial vacuum will also be produced in the vessel, and said gas will rapidly commingle with the water impregnated with carbolic acid therein. The attendant, who can view the cup H through the peep-hole A', is enabled, by means of the rod L, to stir the burning charcoal and sulphur from time to time without admitting air into the vessel. By this process the water is in part relieved from atmospheric pressure, and while thus relieved readily absorbs and mixes with the sulphurous fumes and the carbolic acid, and the medical compound in question is economically produced.

Having described the invention, what I claim is—

1. A water medicating apparatus consisting of an air-tight vessel having its lower part lined with a non-corrodible substance, a supply-funnel provided with a cock, a cup supported upon a bracket and adapted to contain burning charcoal and sulphur, a glazed peep-hole, a stuffing-box adapted to receive through it an agitator, and a draw-off pipe at the bottom of the vessel, substantially as described.

2. The combination, with an air-tight tank, for the purposes described, having its lower portion lined with wood, surrounded by an air-space, a draw-off pipe provided with a cock, a feed-funnel, also provided with a cock, a furnace, H, a glazed peep-hole, and a hand-hole, substantially as described.

CHARLES C. HARKER.

Witnesses:
 JOHN S. HYMAN,
 A. D. MOON.